(12) United States Patent
Weidlich

(10) Patent No.: US 6,771,390 B1
(45) Date of Patent: Aug. 3, 2004

(54) METHOD FOR MODIFYING THE SIZE OF LINE ELEMENTS

(75) Inventor: Ernst Rudolf Gottfried Weidlich, Kiel (DE)

(73) Assignee: Hell Gravure Systems GmbH, Kiel (DE)

(*) Notice: Subject to any disclaimer, the term of this patent is extended or adjusted under 35 U.S.C. 154(b) by 0 days.

(21) Appl. No.: 09/402,843

(22) PCT Filed: Apr. 18, 1998

(86) PCT No.: PCT/DE98/01083

§ 371 (c)(1),
(2), (4) Date: Apr. 18, 2000

(87) PCT Pub. No.: WO98/48380

PCT Pub. Date: Oct. 29, 1998

(51) Int. Cl.[7] ................................................. G06T 3/40
(52) U.S. Cl. ...................................... 358/1.9; 358/3.15
(58) Field of Search .................... 358/1.9, 2.1, 3.15, 358/3.27; 382/199–200, 266–269, 258–259

(56) References Cited

U.S. PATENT DOCUMENTS

| | | |
|---|---|---|
| 3,573,789 A | 4/1971 | Sharp |
| 4,847,641 A | 7/1989 | Tung |
| 5,136,658 A * | 8/1992 | Mori ........................... 382/105 |
| 5,623,593 A | 4/1997 | Spells, III |
| 6,298,156 B1 * | 10/2001 | Ishida et al. ................. 382/197 |

FOREIGN PATENT DOCUMENTS

| | | |
|---|---|---|
| DE | 195 26 529 | 1/1997 |
| EP | 0 594 898 | 5/1994 |
| EP | 0 610 928 | 8/1994 |
| EP | 0 708 415 | 4/1996 |
| EP | 0 743 605 | 11/1996 |

* cited by examiner

Primary Examiner—Thomas D Lee
Assistant Examiner—Stephen Brinich
(74) Attorney, Agent, or Firm—Schiff Hardin LLP (57) ABSTRACT

In a method for changing the size of line elements on a printed page, first the nature of the size change is determined and a positive/negative identifier identifying the nature (positive/negative) of the line elements is determined for each pixel of the printed page. A copy window whose expanse determines the desired size change is defined around a substitution field. Copy window and substitution field are displaced across the printed page, and the density values of the copy window are compared to the density value of the substitution field in each window position. Dependent on the nature of the size change, on the positive/negative identifier determined for the substitution field and on the result of the density value comparison, a decision is made in each window position for the substitution field as to whether the density value of the substitution field is replaced by a characteristic density value of the copy window or by a part thereof or not in order to achieve a broadening and/or narrowing of the line elements.

35 Claims, 5 Drawing Sheets

METHOD FOR MODIFYING THE SIZE OF LINE ELEMENTS

BACKGROUND OF THE INVENTION

The invention is in the field of electronic image processing and is directed to a method for changing the size of positive and negative line elements, particularly within characters, on a black-and-white or chromatic printing page to be reproduced.

Electronic image processing is essentially composed of the image input, the input processing and the image output.

In the image input, density values D for the pixels scanned in the masters are acquired by optoelectronic pixel-by-pixel and line-by-line scanning of individual image masters (continuous tone masters) and text masters (line masters) with a black-and-white scanner for producing a black-and-white printed page.

For producing a chromatic printed page, color values R, G, B which represent the color parts "red" "green" and "blue" of the pixels scanned in the chromatic masters are acquired with a color scanner by optoelectronic pixel-by-pixel and line-by-line scanning of chromatic image masters and chromatic text masters. The color values R, G, B are converted into the color separation values C, M, Y, K according to the laws of subtractive color mixing, these being the color density values of the inks "cyan" C, "magenta" M, "yellow"-Y and "black" K employed in the later printing process.

The density values-D or color separation values Y, M, Y, K acquired in the image input are digitalized and stored as image data files and text data files for the subsequent image processing.

Given image processing in a work station, an electronic page assembly of the images and texts to form a printed page is first implemented according to a layout plan given visual monitoring on a monitor, in that the image data file and the text data file are compiled to form an overall data data file of the printed page and are stored. The texts and text data files required for the page assembly can also be generated by an operator in the work station. The image processing also comprises gradation corrections and, potentially, color corrections and color retouching.

Following the image processing, the image output occurs with a suitable image output device, for example a color recorder for registering color separations for offset printing or with an electronic engraving machine for engraving printing cylinders for rotogravure.

The texts of a printed page generally contain positive and/or negative line elements or written characters. Positive line elements exhibit a higher density value than the density value of the background, whereas negative line elements have a lower density value compared to the density value of the background.

In practice, fine line elements are occasionally lost in printing or are only inadequately reproduced. There is therefore a demand to broaden fine line elements in the image processing such that they can be reproduced with good legibility in the printing.

Traditional methods for changing the size of positive and negative line elements on a printed page have the disadvantage that only one type of line element can be changed in size at one time on a printed page, since, for example, a broadening of positive line elements leads to undesired narrowing of negative line elements.

SUMMARY OF THE INVENTION

It is therefore an object of the invention to improve a method for changing the size of positive and/or negative line elements, particularly of written characters, on a black-and-white or chromatic printed page to be reproduced such that both positive as well as negative line elements can be optimally reproduced on a printed page regardless of the respective density values of the line elements.

According to the present invention, a method is provided for changing a size of positive or negative line elements on a black-and-white printed page to be reproduced, whereby the printed page is divided into pixels and a density value representing "white", "gray", or "black" is allocated to each pixel, and wherein each line element is comprised of at least one pixel. A type of the size change of the line elements is determined, such as a broadening or narrowing. By evaluating density values, each pixel of the black-and-white printed page is investigated to see whether it is a component part of a positive or negative line element. A corresponding positive or negative identifier is determined for each pixel that is a component part of a positive or negative line element. A copy window is defined around a substitution field comprised of at least one pixel, an expanse of the copy window determining a desired size change of the line elements. The copy window is displaced with the substitution field pixel-by-pixel across the black-and-white printed page. The density values of pixels falling into the copy window are compared to a density value of the substitution field in each window position on the black-and-white printed page. Dependent on the determined size change, based on the positive/negative identifier determined for the pixel of the substitution field and based on a result of the density value comparison, a decision is made for the pixel of the substitution field in every window position on the black-and-white printed page as to whether the density value of the substitution field should be replaced by a characteristic density value of the pixels of the copy window or by a part thereof or not. The density value of the substitution field is substituted as warranted in each window position on the black-and-white printed page.

DESCRIPTION OF THE PREFERRED EMBODIMENT

The inventive method for changing the size of positive and/or negative line elements on a black-and-white or chromatic printed page on the basis of the overall data file of the printed page is essentially composed of two method steps A and B.

Given image processing in a work station, the overall data file, as already mentioned in the introduction to the specification, is compiled from a text data file (line-work data file) or from the combination of a text data file with an image data file (continuous tone data file) according to a layout plan to form the overall data file of the printed page and is stored.

A printed page is subdivided into individual pixels, and each line element of the printed page is composed of at least one pixel. In the overall data file of a black-and-white printed page, a density value D for "black", "white" or "gray" is allocated to each pixel. In the overall data file of a chromatic printed page, the color of each pixel is defined either by color separation values C, M, Y, K or by a color number F number. The color separation values C, M, Y, K of a pixel identify the color densities or, respectively, the raster dot sizes or raster percentages of the individual inks "cyan" C, "magenta" M, "yellow" Y and "black" K that must be employed in order to generate the defined color of the pixel given superimposed printing. The color number F number of a pixel identifies a mixed color to be printed as predetermined percentage parts of the individual inks "cyan" C, "magenta" M, "yellow" Y and "black" K. In method A, the nature (positive; negative) of the line elements located on the printed page is first identified as positive/negative identifiers "N" or "P" for each pixel on the basis of the respective overall data data file of a black-and-white or chromatic printed page and is stored for further processing.

Figure 1:
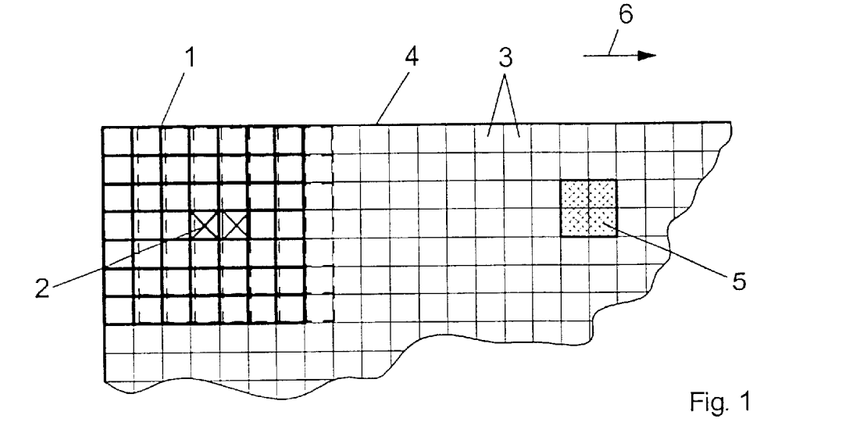
FIG. 1 shows a decision window with an identifier field on a printed page given pixel-by-pixel displacement across the printed page.

In a first step $A_1$, a decision window 1 having a smaller identifier field 2 is defined, this lying, for example, in the center of a rectangular decision window 1. The decision window 1 covers a predetermined plurality of pixels 3 of a printed page 4 to be investigated. The plurality of pixels 3 is selected dependent on the respective size of the line elements 5 contained in the printed page 4. An unambiguous recognition of the line elements 5 is achieved, for example, with 100×100 pixels 3 within the decision window 1. The identifier field 2 contains at least one pixel, an individual pixel 3 in the exemplary embodiment. In the case of a chromatic printed page 4, the size of the decision window 1 can be selected the same or differently for the individual color separations.

In a second step $A_2$, the decision window 1 with the identifier field 2 for the determination of the positive/negative identifier for each pixel 3 of the printed page 4 is displaced line-by-line across the overall data file of the corresponding printed page 3, this intellectually corresponding to a displacement of the decision window 1 and of the identifier field 2 across the printed page (4).

FIG. 1 shows portions of a printed page 4 with a line element 5 subdivided into pixels 3. A decision window 1 displaceable across the printed page 4 and comprising an identifier field 2 composed of a pixel in the center is also shown.

The displacement of the decision window 1 with the identifier field 2 across the printed page 4 can occur in various ways.

In a first embodiment, the decision window 1, as shown in FIG. 1, is displaced, step-by-step from pixel 3 to pixel 3 in the line direction 6 and, following a line, is shifted perpendicularly thereto to the next line, so that a positive/negative identifier is identified for each pixel 3. In this embodiment, an exact evaluation of the decision window 1 is in fact achieved.

Figure 2:
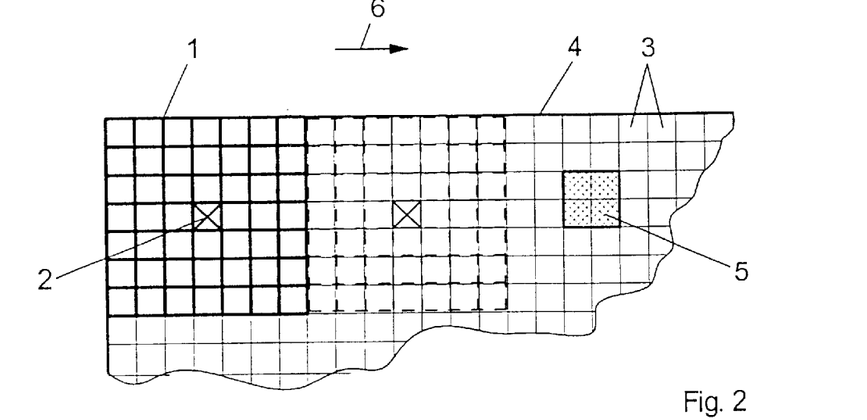
FIG. 2 shows a decision window having an identifier field on a printed page given tile-shaped displacement across the printed page.

Given a second embodiment shown in FIG. 2, the decision window 1 is respectively shifted step-by-step by its expanse in the line direction 6 and perpendicular thereto, so that the decision window 1 is displaced in the form of tiles abutting one another. In this case, a positive/negative identifier is determined only for pixels 3 spaced according to the window expanse, and the pixels 3 lying therebetween respectively have the identified positive/negative identifier of the closest pixel 3 allocated to them. In this embodiment, a short calculating time derives, but at the expense of the precision.

Figure 3:
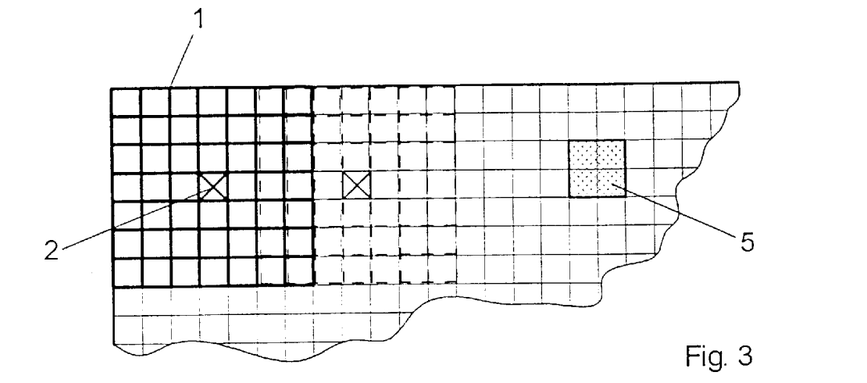
FIG. 3 shows a decision window having an identifier field on a printed page given overlapping displacement across the printed page.

FIG. 3 shows a third embodiment as compromise between the first and second embodiment. In the third embodiment, every $n^{th}$ pixel 3 is defined whereat a positive/negative identification is simply implemented, and the decision window 1 is correspondingly shifted overlapping.

When the decision window 1 in the displacement projects beyond an edge of the printed page 4, no values for interpretation are present in the area of the decision window 1 projecting beyond the edge. In this case, the lacking values could be acquired by mirroring the values at the respective edge of the printed page 4 present in the other region of the decision window 1.

In a third step $A_3$, a decision is made for every pixel 3 lying in the identifier field 2 at the moment in each position of the displaced decision window 1 and of the identifier field 2 on the printed page 4 as to whether it is a component part of a positive or negative line element 5 or is not a component part at all of a line element 5 on the printed page 4. Dependent on the decision that has been made, a positive/negative identifier is then allocated to the corresponding pixel 3.

The decision about the positive/negative identifier of a pixel 3 lying in the identifier field 2 ensues by interpreting the density values D of the environment in the case of a black-and-white printed page 4, namely those pixels 3 that lie within the decision window 1 in every window position and, in the case of a chromatic printed page 3 occurs by evaluation of the corresponding color parts in the form of the color separation values C, M, Y, K or of the color numbers F numbers.

Interpretation of the Density Values D of a Black-and-white Printed Page

In every window position, the frequency distribution H of the density values D or, respectively, of a defined density value range of the pixels 3 lying within the decision window 1 is first calculated as histogram, whereby it is essentially the highest and the lowest frequencies H that are of significance for the evaluation.

For determining the positive/negative identifier of the corresponding pixel 3, the frequency distribution H of the density values D of a black-and-white printed page is then evaluated according to the following decision criteria.

When the density values $D_H$ of the background are lower than the other density values $D_S$ in the decision window 1 and the frequency $H_H$ of the density values $D_H$ of the background is higher compared to the frequency $H_S$ of the other density values $D_S$, then it is a matter of a pixel 3 of a positive line element 5, and a corresponding positive identifier is allocated to the pixel 3.

When the density values $D_H$ of the background, by contrast, are higher than the other density values $D_S$ in the decision window 1 and the frequency $H_H$ of the density values $D_H$ of the background is lower compared to the frequency $H_S$ of the other density values $D_S$, then it is a matter of a pixel 3 of a negative line element 5, and a corresponding negative identifier is allocated to the pixel 3.

Figure 4A:
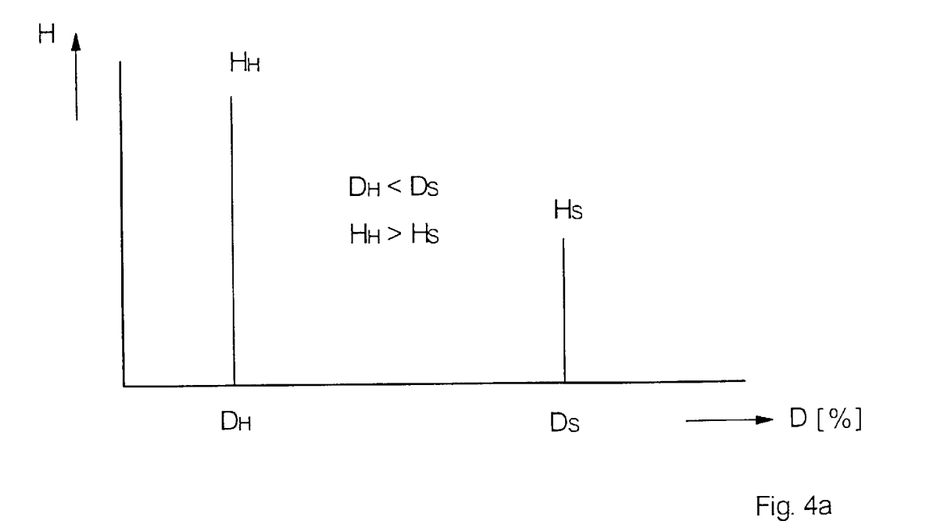
FIG. 4 illustrates characteristic histograms for positive and negative line elements.
Figure 4B:
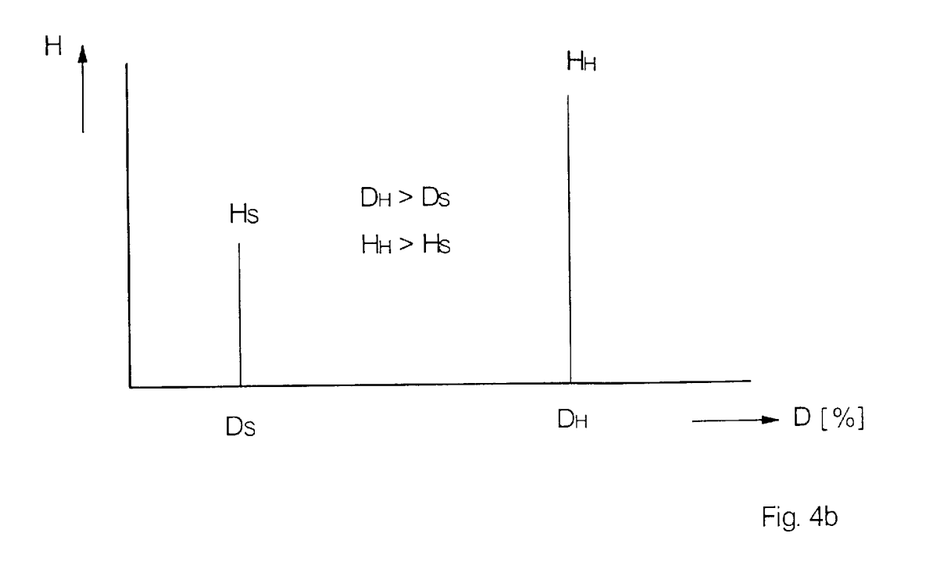
Figure 5A:
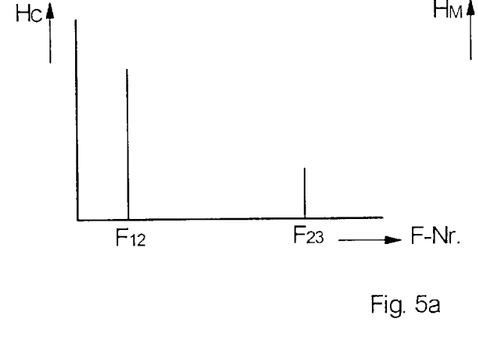
FIG. 5 illustrates characteristic individual histograms of the percentage color parts for a positive line element.
Figure 5B:
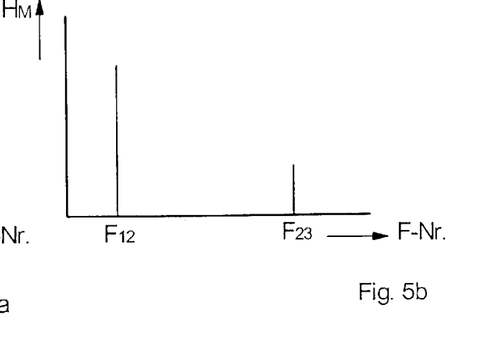
Figure 5C:
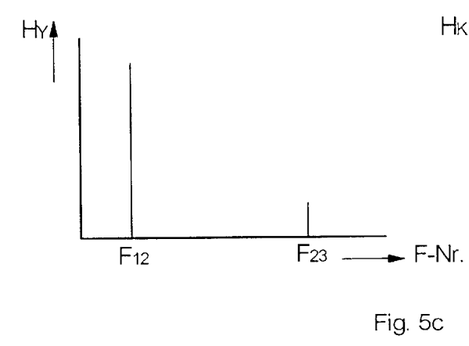
Figure 5D:
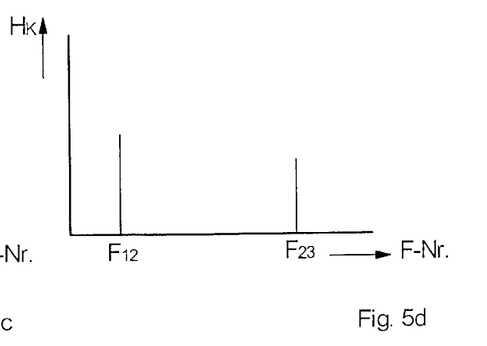

FIG. 4 shows characteristic histograms H d for a positive line element on a bright background with $D_H<D_S$ and $H_H>H_S$ FIG. 4a and for a negative line element on a dark background $D_H>D_S$ and $H_H>H_S$ FIG. 4b.

Evaluation of the Color Separation Values (C, M, Y, K) of a Chromatic Printing Page In each window position, the frequency distributions of the color separation values C, M, Y, K occurring in the decision window 1 are first separately identified for each color separation as individual histograms $H_C$ C, $H_M$ M, $H_Y$ Y and $H_K$ K.

For determining the positive/negative identifier of the pixel 3 of the decision window 1 lying in the identifier field 2 in each window position, at least one of the individual histograms of the color separations, preferably all four individual histograms of the color separations, separately, are evaluated.

Deviating therefrom, an overall histogram $H_{CMYK}$ C, M, Y, K can be produced from all four individual histograms $H_C$ C, $H_M$ M, $H_Y$ Y and $H_K$ K and this can be evaluated.

For generating the overall histogram $H_{CMYK}$ C, M, Y, K, the colors C, M, Y, K are weighted according to the following equations for norming the blackening with different weighted coefficients G.

$$C^* = G_C \times C$$

$$M^* = G_M \times M$$

$$Y^* = G_Y \times Y$$

$$K^* = G_K \times K$$

According to the color theory and the respective printing process, for example, the following weighting coefficients G are selected:

$$G_C = 1.00$$

$$G_M = 0.33$$

$$G_Y = 0.16$$

$$G_K = 1.00$$

Subsequently, the overall histogram $H_{CMYK}$ C, M, Y, K shared by all color separations is determined for each color separation value C, M, Y, K by summing up the corresponding, weighted color separation values Y*, M*, Y*, K*.

The evaluation of the individual histograms or of the overall histograms occurs according to the above-recited decision criteria for a black-and-white printing page.

Evaluation of the Color Numbers (F Numbers) of a Chromatic Printing Page

The color number, for example from $F_1$ through $F_{255}$, of a pixel identifies a mixed color to be printed as predetermined, percentage color parts of the individual colors "cyan" C, "magenta" M, "yellow" Y and "black" K. The table shown excerpted provides an example:

| Color No. | C | M | Y | K |
| --- | --- | --- | --- | --- |
| $F_{12}$ | 10% | 20% | 30% | 40% |
| $F_{18}$ | 30% | 15% | 25% | 30% |
| $F_{23}$ | 60% | 5% | 10% | 25% |

In every window position, the frequency distributions of the color numbers F numbers occurring in the decision window 1 are separately identified for each color part as individual histograms $H_C$F-number, $H_M$F-number, $H_Y$F-number and $H_K$F-number.

Subsequently, the percentage color parts C, M, Y, K of the individual color numbers F-number are weighted for norming the blackening with the above-recited weighting coefficients G.

Subsequently, the overall histogram $H_{CMYK}$ F-number shared by all color parts is calculated for each color number F-number by summing up the corresponding, weighted percentage color part Y*, M*, Y*, K*, this in turn being evaluated according to the above-recited decision criteria for a black-and-white printing page in order to identify the positive/negative identifier of the corresponding pixel 3.

In an example, the weighted, percentage color parts C*=4.6%, M*=6.6%, Y*=5.8% and K*=40.0% derive for the color number $F_{12}$ having the percentage color parts C, M, Y, K recited in the table and having the weighting coefficients $G_C$, $G_M$, $G_Y$, $G_K$. By summing up these weighted, percentage color parts, a value of 57% as weighted black value from all color parts then derives, for example, for the color number $F_{12}$.

FIG. 5 shows characteristic individual histograms $H_C$ F-number, $H_M$ F-number, $H_Y$F-number and $H_K$F-number of the individual, percentage color parts C, M, Y, K for a positive line element, whereby, for example, the color number $F_{12}$ represents the color of the background and the color number $F_{21}$ represents the color of the line element 5.

Figure 6:
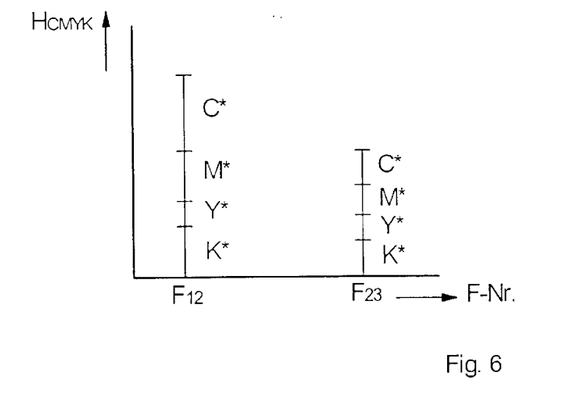
FIG. 6 illustrates an overall histogram for a positive line element formed from the weighted color parts.

FIG. 6 shows the overall histogram $H_{CMYK}$F-number for a positive line element formed from the weighted color parts C*, M*, Y*, K*.

Alternatively to the central identifier field 2, an arbitrary pixel 3 within the decision window 1 can also be defined as identifier field 2.

The positive/negative identifiers for all pixels of the printed page determined in the method step A, can be determined before the method step B and can, for the implementation of method step B, be stored in the form of an identifier table in which a "P" or "N" is allocated to each pixel 3 of the printed page 4.

Alternatively thereto, the method step A can be implemented with a time lead on line with the method step B.

In method step B, the size change of the line elements 5 on the printed page 5 is undertaken on the basis of the positive/negative identifiers for each pixel 3 of a printed page 4 identified in method step A.

The steps $B_1$ through $B_5$ are first explained for a black-and-white printed page 4.

A determination is made in a first step $B_1$ as to whether a broadening or a narrowing of the line elements 5 is to occur in the size change. The determination can be globally determined for an entire printed page 4, for selectable areas of a printed page 4 by corresponding masking of the regions or can be separately determined for each line element 5 of a printed page 4. In this latter case, a corresponding identifier "broadened" or "narrow" is allocated to each pixel 3 of the printed page 4 and is stored in callable fashion for each pixel 3.

In a second step $B_2$, a copy window 7 having a plurality of pixels 3 is defined that contains a smaller substitution field 7 covering at least one pixel 3. The width in pixels of the substitution field 8 up to the edge of the copy window 7 determines the width of the size change of the line elements 5 in pixels. On the basis of the arbitrarily selectable shape of the copy window 7 around the substitution field 8, a determination is made as to whether the size change should occur at the entire contour of the line elements 5 or only at the contours in the text direction or perpendicularly thereto. For example, given a quadratic, symmetrical shape of the copy window 7 around the substitution field 8, a uniform size change occurs at the entire contour of the line elements 5.

In a third step $B_3$, the copy window 7 with the substitution field 8 is shifted across the black-and-white printed page 4 pixel-by-pixel and line-by-line.

In each position of the shifted copy window 7 and of the substitution field (8) on the black-and-white printed page 4, the density value $D_Z$ falling into the substitution field 8 and the density values of the environment, namely the density values $D_U$ falling into the copy window 7, are called and the called density values $D_U$, $D_Z$ are compared to one another, namely taking the positive/negative identifier determined in steps $A_1$ through $A_3$ for the pixel 3 falling into the substitution field 8 and the type of size change of the line elements 5 determined in the step $B_1$ into consideration.

In a fourth step $B_4$, a decision is then made in each position of the shifted copy window 7 and of the substitution field 8 on the basis of the result of the density value comparison as to whether the density value $D_Z$ present in the substitution field 8 should be replaced by a characteristic density value $D_U$ of the pixels 3 of the copy window 7 or by a part thereof or not.

Figure 7:
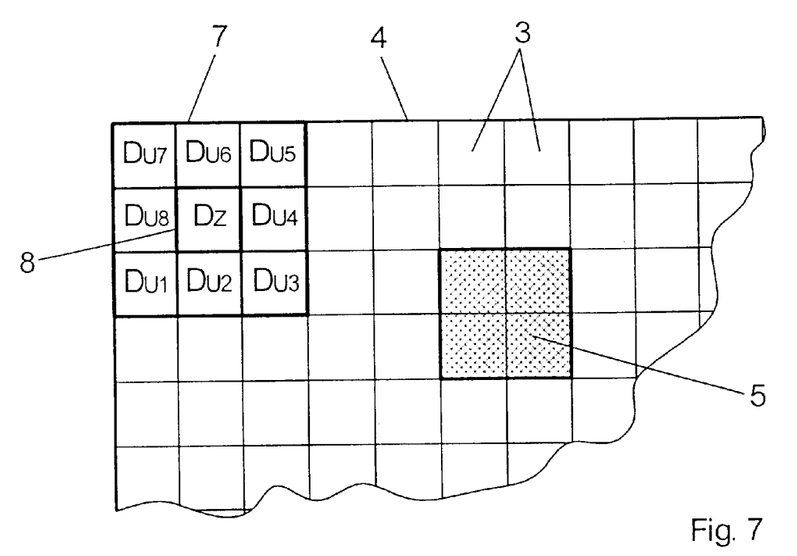
FIG. 7 shows a quadratic copying window having a central substitution field.

FIG. 7 shows a quadratic copy window 7 with a central substitution field 8 on a printed page 4 shown excerpted. The copy window 7 covers 8 pixels 3 having the density values $D_{U1}$ through $D_{U8}$. The substitution field 8 covers one pixel 3 with the density value $D_Z$. The width of the copy window amounts to one pixel 3, so that a size change of one pixel 3 can be achieved at each contour of a line element 5.

Figure 8:
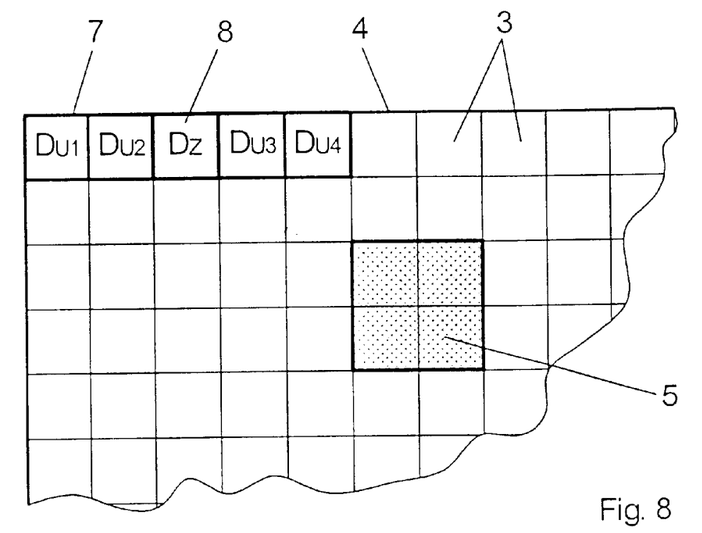
FIG. 8 illustrates a modified copying window.

FIG. 8 shows a copy window 7 that is asymmetrical relative to the substitution field 8 and that comprises 4 pixels 3 having the density values $D_{U1}$ through $D_{U4}$. The substitution field 8 is composed of one pixel 8 with the density value $D_Z$. The copy window 7 has a width of two pixels 3, so that a broadening by one pixel 3 is only achieved at the contours of the line elements 5 proceeding perpendicular to the text line.

In a fifth step B5, the substitution of the density value $D_Z$ present in the substitution field 8 with the identified, characteristic density value $D_U$ of the pixels (3) of the copy window 7 or with a part of this density value $D_U$ is subsequently undertaken in each position of the shifted copy window 7 dependent on the decision made in step $B_4$, as warranted.

The steps $B_4$ and $B_5$ can also be simultaneously implemented. In this case, the decision about a potential substitution according to step $B_4$ is undertaken on a copy of the printed page 4 and the substitution according to step $B_5$ is undertaken on the printed page 4 itself.

The broadening and narrowing of positive and negative line elements 5 on a black-and-white printed page 4 by transferring or copying characteristic density values $D_U$ of the copy field 7 into the substitution field 8 dependent on the events in the comparison of the density values $D_Z$, $D_U$ is explained in greater detail below.

The Broadening of Positive Line Elements

Figure 9:
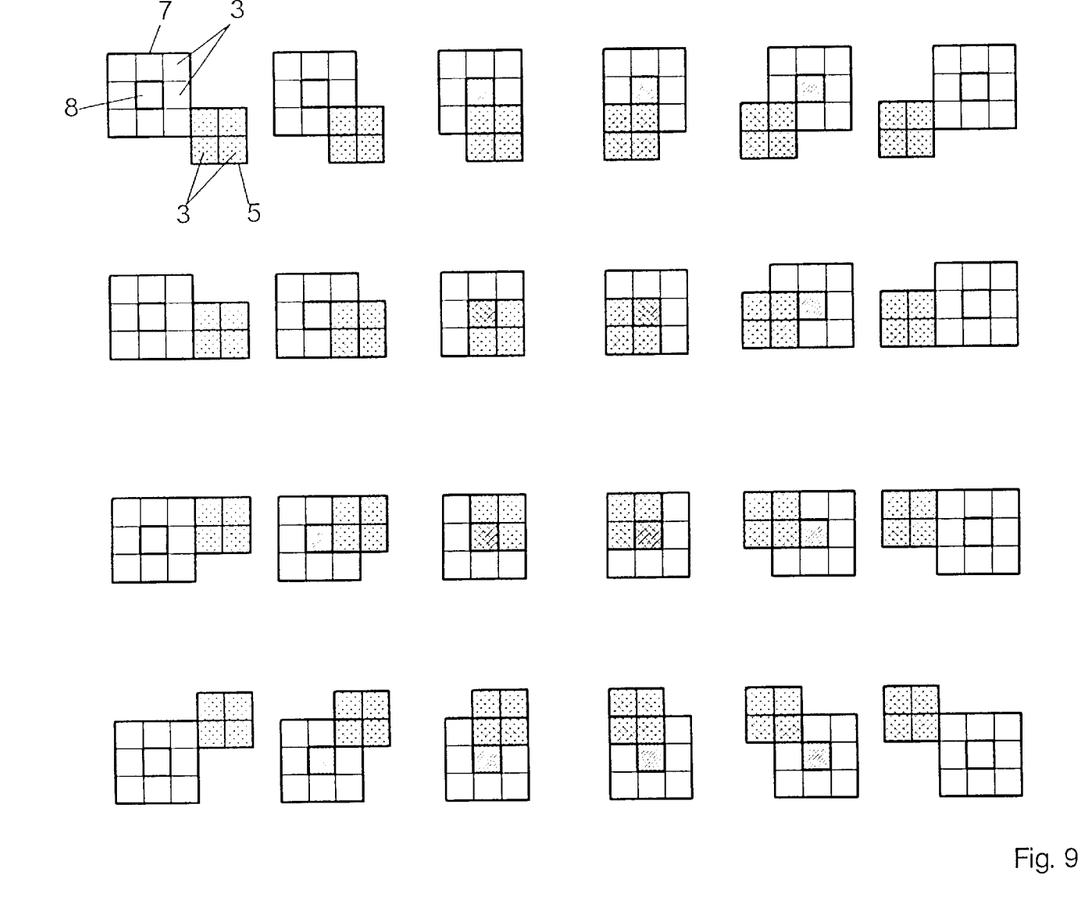
FIG. 9 is an example for the broadening of a positive line element.

Given a broadening of positive line elements 5, which corresponds to a narrowing of negative line elements 5, the density value $D_Z$ of the pixel of the substitution field 8 is always replaced in each window position by the maximum density value $D_{umax}$ of the pixels of the copy window 7 or by a part thereof when, in the comparison of the density values $D_U$, $D_Z$, it is found that the density value $D_U$ of at least one pixel of the copy window 7 is higher than the density value $D_Z$ of the substitution field 8. With reference to the example of a broadening of a positive line element 5, FIG. 9 shows the decision made in every window position as to whether the pixel 3 falling into the respective substitution field 8 is substituted or not.

A positive line element 5 composed of 4 pixels 3 and a symmetrical copy window 7 composed of 8 pixels 3 with a central substitution field 8 composed of one pixel 3, which is displaced pixel-by-pixel, is shown. The symmetrical copy window 7 has a width of one pixel 12 over the entire circumference, so that the broadening occurs at the entire contour of the line element 5. A substitution is indicated in that the corresponding substitution field 8 is hatched.

Figure 10:
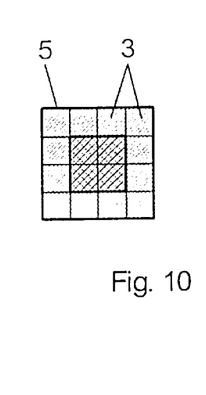
FIG. 10 shows a broadened positive line element.

FIG. 10 shows the correspondingly broadened, positive line element 5.

The Broadening of Negative Line Elements

Given a broadening of negative line elements 5, which corresponds to a narrowing of positive line elements 5, the density value $D_Z$ of the pixel of the substitution field 8 is always replaced in every window position by the minimum density value $D_{umin}$ of the pixels of the copy window 7 or by a part thereof when, in the comparison of the density values $D_U$, $D_Z$, it is found that the density value $D_U$ of at least one pixel of the copy window 7 is lower than the density value $D_Z$ of the substitution field 8.

When a broadening and/or a narrowing is to occur at the line elements 5 of a chromatic printed page 5, the steps $B_1$ through $B_5$ are separately applied to each color separation of the chromatic printed page-5, whereby the corresponding color density or color separation values C, M, Y, K are utilized instead of the density values D. Different broadenings and/or narrowings of the line elements 5 can thereby be achieved at the individual color separations by variable widths of the copy window 7. Likewise, different parts of the color separations C, M, Y, K can be copied into the substitution field 8 in the individual color separations.

Although various minor changes and modifications might be proposed by those skilled in the art, it will be understood that my wish is to include within the claims of the patent warranted hereon all such changes and modifications as reasonably come within my contribution to the art.

What is claimed is:

1. A method for changing a size of positive or negative line elements, on a black-and-white printed page to be reproduced, whereby the printed page is divided into pixels and a density value representing "white", "gray" or "black" is allocated to each pixel and each line element is composed comprised of at least one pixel, comprising the steps of:

determining a type of the size change of the line elements;

by evaluating density values, investigating each pixel of the black-and-white printed page to see whether it is a component part of a positive or negative line element;

determining a corresponding positive or negative identifier for each pixel that is the component part of the positive or negative line element;

defining a copy window around a substitution field comprised of at least one pixel, an expanse of said copy window determining a desired size change of the line elements;

displacing the copy window with the substitution field pixel-by-pixel across the black-and-white printed page;

comparing density values of pixels falling into the copy window to a density value of the substitution field in each window position on the black-and-white printed page;

dependent on the determined size change, based on the positive/negative identifier determined for the pixel of the substitution field and based on a result of the density value comparison, making a decision for the pixel of the substitution field in every window position on the black-and-white printed page as to whether the density value of the substitution field should be replaced by a characteristic density value of the pixels of the copy window or by a part thereof or not; and substituting the density value of the substitution field as warranted in each window position on the black-and-white printed page.

2. The method according to claim 1 wherein the type of size change comprises a broadening or narrowing of the line elements.

3. The method according to claim 2 wherein, given a broadening of positive line elements or a narrowing of negative line elements, the density value of the pixel of the substitution field is replaced in each window position on the black-and-white printed page by a characteristic density value of the pixels of the copy window when it is found in the comparison of the density values that the density value of at least one pixel of the copy window is higher than the density value of the substitution field.

4. The method according to claim 3 wherein the characteristic density value is the maximum value of the density values of the pixels of the copy window.

5. The method according to claim 2 wherein, given a broadening of negative line elements or a narrowing of positive line elements, the density value of the pixel of the substitution field is replaced in every window position on the black-and-white printed page by a characteristic density value of the pixels of the copy window when it is found in the comparison of the density value that at least one density value of the pixels of the copy window is lower than the density value of the substitution field.

6. The method according to claim 5 wherein the characteristic density value is a minimum value of the density values of the pixels of the copy window.

7. The method according to claim 1 wherein for determining the positive/negative identifier of the individual pixels of a black-and-white printed page;

a decision window covering a plurality of pixels is defined and displaced across the black-and-white printed page;

a frequency distribution of the density values of the pixels falling into the decision window is identified as a histogram in every window position on the black-and-white printed page; and the positive/negative identifier of at least one of the pixels falling into the respective decision window is determined in each window position on the black-and-white printed page by evaluating the histogram.

8. The method according to claim 7 wherein a line element lying within the decision window is recognized as positive in the evaluation of the histograms when the density values of the background of the black-and-white printed page in the decision window is lower than the other density values and the frequency of the density values of the background is higher compared to the frequency of the other density values.

9. The method according to claim 7 wherein a line element lying within the decision window is recognized as negative in the evaluation of the histograms when the density values of the background of the black-and-white printed page in the decision window is higher than the other density values and the frequency of the density values of the background is lower in comparison to the frequency of the other density values.

10. The method according to claim 1 wherein the line elements comprise written characters.

11. The method according to claim 1 wherein the substitution field lies in a center of the copy window.

12. The method according to claim 1 wherein the positive/negative identifiers are determined before the size change of the line elements.

13. The method according to claim 7 wherein the decision window is displaced pixel-by-pixel; and the positive/negative identifier of at least one of the pixels falling into the decision window is determined in each window position by evaluation of the corresponding histograms.

14. The method according to claim 7 wherein the decision window is displaced pixel-by-pixel;

the positive/negative identifier of one of the pixels falling into the decision window is determined in each window position by evaluating the corresponding histograms; and the determined positive/negative identifier is transferred onto all pixels of the decision window.

15. The method according to claim 7 wherein a central identifier field covering at least one pixel is defined in the decision window;

the decision window is displaced pixel-by-pixel; and the positive/negative identifier for the pixel falling into the identifier field is determined in each window position.

16. The method according to claim 7 wherein a central identifier field covering at least one pixel is defined in the decision window;

the decision window is shifted in terms of its expanse;

the positive/negative identifier for the pixel falling into the respective identifier field is determined in each window position; and the positive/negative identifiers determined in the respective window positions are allocated to the pixels lying therebetween.

17. The method according to claim 7 wherein a central identifier field covering at least one pixel is defined in the decision window;

the decision window is displaced in overlapping fashion;

the positive/negative identifier for the pixel falling into the respective identifier field is determined in each window position; and the positive/negative identifiers determined in the respective window positions are allocated to the pixels lying therebetween.

18. A method for changing a size of positive or negative line elements on a chromatic printed page to be reproduced that is present in the form of color separations, whereby each color separation is divided into pixels, and a color separation value representing a respective color part is allocated to each pixel, comprising the steps of:

determining type of the size change of the line elements;

by evaluating the color parts, investigating each pixel of the individual color separations of the chromatic printed page to see whether it is a component part of a positive or negative line element;

determining a corresponding positive or negative identifier for each pixel that is the component part of the positive or negative line element;

defining a copy window around a substitution field comprised of at least one pixel, an expanse of said copy window determining a desired size of the line elements;

displacing the copy window with the substitution field pixel-by-pixel across the individual color separations separately;

comparing the corresponding color separation values of the pixels falling into the copy window in each window position on each of the color separations to the corresponding color separation value of the substitution field;

dependent on the identified type of size change, on the positive/negative identifier determined for the pixel of the substitution field and on the result of the comparison of the color separation values, in each window position on each of the color separations for the pixel of the substitution field determining whether the color separation value of the pixel of the substitution field in each window position on each of the color separations is replaced by a characteristic color separation value of the pixels of the copy window or by a part thereof or not; and replacing the corresponding color separation value of the substitution field in each window position in at least one of the color separations as warranted.

19. The method according to claim 18 wherein the type of size change comprises a broadening or a narrowing.

20. The method according to claim 19 wherein, given a broadening of positive line elements or a narrowing of negative line elements, the color separation value of the pixel of the substitution field is replaced by a characteristic color separation value of the pixels of the copy window when it is decided in the comparison of the color separation values that the color separation value of at least one pixel of the copy window is higher than the color separation value of the substitution field.

21. The method according to claim 20 wherein the characteristic color separating value is a maximum value of the color separation values of the pixels of the copy window.

22. The method according to claim 19 wherein, given a broadening of negative line elements or a narrowing of positive line elements, the density value of the pixel of the substitution field is replaced in every window position on each of the color separations by a characteristic color separation value of the pixels of the copy window when it is found in the comparison of the color separation values that at least one color separation value of the pixels of the copy window is lower than the color separation value of the substitution field.

23. The method according to claim 22 wherein the characteristic color separation value is a minimal value of the color separation values of the pixels of the copy window.

24. The method according to claim 18 wherein for determining the positive/negative identifiers of the pixels of the individual color separations:

a decision window covering a plurality of pixels is defined and is displaced across the individual color separations separately;

a frequency distribution of the color separation values of the pixels falling into the decision window are determined as individual histograms in each window position on each of the color separations; and the positive/negative identifier of at least one of the pixels respectively falling into the decision window is determined in each window position on each of the color separations by evaluating the individual histograms.

25. The method according to claim 18 wherein for determining the positive/negative identifiers of the pixels of the individual color separations:

a decision window covering a plurality of pixels is defined and is displaced across the individual color separations separately;

frequency distributions of the color separation value of the pixels falling into the decision window are determined as an individual histogram in each window position on each color separation;

the color separation values of the individual color separations are weighted with different correction factors;

an overall histogram for all color separations is determined by addition of the weighted color density values; and the positive/negative identifier of at least one of the pixels falling into the respective decision window is determined in each window position by evaluating the overall histogram.

26. The method according to claim 18 wherein the substitution field lies in a center of the copy window.

27. The method according to claim 18 wherein the positive/negative identifiers are determined before the size change of the line elements.

28. The method according to claim 24 wherein the decision window is displaced pixel-by-pixel; and the positive/negative identifier of at least one of the pixels falling into the decision window is determined in each window position by evaluation of the corresponding histograms.

29. The method according to claim 24 wherein the decision window is displaced pixel-by-pixel;

the positive/negative identifier of one of the pixels falling into the decision window is determined in each window position by evaluating the corresponding histograms; and the determined positive/negative identifier is transferred onto all pixels of the decision window.

30. The method according to claim 24 wherein a central identifier field covering at least one pixel is defined in the decision window;

the decision window is displaced pixel-by-pixel; and the positive/negative identifier for the pixel falling into the identifier field is determined in each window position.

31. The method according to claim 24 wherein a central identifier field covering at least one pixel is defined in the decision window;

the decision window is shifted in terms of its expanse;

the positive/negative identifier for the pixel falling into the respective identifier field is determined in each window position; and the positive/negative identifiers determined in the respective window positions are allocated to the pixels lying therebetween.

32. The method according to claim 24 wherein a central identifier field covering at least one pixel is defined in the decision window;

the decision window is displaced in overlapping fashion;

the positive/negative identifier for the pixel falling into the respective identifier field is determined in each window position; and the positive/negative identifiers determined in the respective window positions are allocated to the pixels lying therebetween.

33. A method for changing a size of positive or negative line elements, on a black-and-white printed page to be reproduced, whereby the printed page is divided into pixels and a density value representing "white", "gray" or "black" is allocated to each pixel and each line element is comprised of at least one pixel, comprising the steps of:

determining a type of the size change of the line elements;

by evaluating density values, investigating each pixel of the black-and-white printed page to see whether it is a component part of a positive or negative line element;

determining a corresponding positive or negative identifier for each pixel that is the component part of the positive or negative line element;

defining a copy window around a substitution field composed comprised of at least one pixel, said copy window determining a desired size change of the line elements;

displacing the copy window with the substitution field across the black-and-white printed page;

comparing density values of pixels falling into the copy window to a density value of the substitution field in each window position on the black-and-white printed page;

dependent on the determined size change, based on the positive/negative identifier determined for the pixel of the substitution field and based on a result of the density value comparison, making a decision for the pixel of the substitution field in window positions on the black-and-white printed page as to whether the density value of the substitution field should be replaced by a characteristic density value of the pixels of the copy window or by a part thereof or not; and substituting the density value of the substitution field as warranted in window positions on the black-and-white printed page.

34. A method for changing a size of positive or negative line elements, on a black-and-white printed page to be reproduced, whereby the printed page is divided into pixels and a density value representing "white", "gray" or "black" is allocated to each pixel and each line element is comprised of at least one pixel, comprising the steps of:

determining a type of the size change of the line elements;

by evaluating density values, investigating each pixel of the black-and-white printed page to see whether it is a component part of a positive or negative line element;

determining a corresponding positive or negative identifier for each pixel that is the component part of the positive or negative line element;

defining a copy window around a substitution field composed of at least one pixel, said copy window determining a desired size change of the line elements;

displacing the copy window with the substitution field across the black-and-white printed page;

comparing density values of pixels falling into the copy window to a density value of the substitution field in each window position on the black-and-white printed page;

dependent on the determined size change, based on the positive/negative identifier determined for the pixel of the substitution field and based on a result of the density value comparison, making a decision for the pixel of the substitution field in window positions on the black-and-white printed page as to whether the density value of the substitution field should be replaced by a characteristic density value of the pixels of the copy window or by a part thereof or not; and substituting the density value of the substitution field as warranted in window positions on the black-and-white printed page.

35. A method for changing a size of positive or negative line elements on a chromatic printed page to be reproduced that is present in the form of color separations, whereby the color separations are divided into pixels, and a color separation value representing a respective color part is allocated to each pixel, comprising the steps of:

determining a type of the size change of the line elements;

by evaluating the color parts, investigating pixels of the individual color separations of the chromatic printed page to see whether they are a component part of a positive or negative line element;

determining a corresponding positive or negative identifier for each pixel that is the component part of the positive or negative line element;

defining a copy window around a substitution field comprised of at least one pixel, said copy window determining a desired size of the line elements;

displacing the copy window with the substitution field across the individual color separations separately;

comparing the corresponding color separation values of the pixels falling into the copy window in window positions on the color separations to the corresponding color separation value of the substitution field;

dependent on the identified type of size change, on the positive/negative identifier determined for the pixel of the substitution field and on the result of the comparison of the color separation values, in window positions on the color separations for the pixel of the substitution field determining whether the color separation value of the pixel of the substitution field in the window positions are the color separations is replaced by a characteristic color separation value of the pixels of the copy window or by a part thereof or not; and replacing the corresponding color separation value of the substitution field in each window position in at least one of the color separations as warranted.

* * * * *